Patented June 30, 1931

1,812,250

UNITED STATES PATENT OFFICE

BERNHARD CONRAD STUER, OF AACHEN, GERMANY, ASSIGNOR TO THE FIRM RHENANIA VEREIN CHEMISCHER FABRIKEN AKTIEN-GESELLSCHAFT, OF AACHEN, GERMANY, A CORPORATION OF GERMANY

MANUFACTURE OF BARIUM HYDROXIDE AND STRONTIUM HYDROXIDE

No Drawing. Application filed March 29, 1924. Serial No. 702,965, and in Germany April 6, 1926.

This invention aims at providing a more simple and more direct process of manufacture of barium hydroxide or strontium hydroxide in replacement of the usual process in which the sulphides are converted into carbonates which are then heated, the oxides thus produced being converted into hydroxides.

It has been known for a long time that a solution of equimolecular quantities, for example of $Ba(OH)_2$ and $Ba(SH)_2$ is produced by dissolving the sulphides in water. If however an attempt is made to crystallize the hydroxides out of these solutions, the said hydroxides are contaminated by so large a proportion of sulphides that even by repeated recrystallizations they are only incompletely purified. The material must be separately treated with heavy metal oxides to produce sulphide-free barium hydroxide or strontium hydroxide in this way.

If, for instance 1000 grams of yellow barium sulphide solution of 10 Bé. are mixed with 30 grams of carbonate free caustic soda solution of 26° Bé. and this mixture is shaken up in a closed vessel with the exclusion of the admission of atmospheric carbon dioxide, then after a week's standing no separation of barium hydrate can be determined. Just as little separation of barium hydrate is observed if, in the place of caustic lye, 30 grams of 25 per cent. solution of ammonia in water is used. The only apparent change is that the yellow solution is converted into a colourless one.

According to the present invention hydroxides of alkaline earth metals, forming water-soluble sulphides, i. e. barium hydroxides, or strontium hydroxides are produced from the corresponding sulphides by treating the said sulphides with ammonia in the presence of water.

The present invention may be carried out for example by introducing ammonia into a solution of barium sulphide or strontium sulphide or by mixing the sulphide solution with an aqueous solution of ammonia. Half the proportion of barium or strontium is precipitated as a hydroxide from the solution which may be cooled if necessary to render the separation more complete. The hydroxides separated from the mother liquor are now washed, preferably with ammonia-containing water. The products thus obtained still contain a very small quantity of sulphides of which they may me completely freed by one recrystallization, preferably from ammonia-containing water.

In the process according to the present invention half the amount of barium or strontium is obtained as pure hydroxide while the remainder is in solution as a hydrosulphide. According to a further feature of the invention, this residue is converted into a hydroxide with the aid of caustic alkali which may be added to the solution before or after treatment with ammonia. Of course, barium hydroxide or strontium hydroxide may be extensively precipitated from solutions of sulphides through the medium of sodium hydroxide or potassium hydroxide and without the aid of ammonia provided a large excess of caustic alkali is used. The result however is that with sulphides there are produced highly impure hydroxides and solutions which can be utilized only with great difficulty and which contain large quantities of unused caustic alkali in addition to alkali metal sulphides. In contradistinction to this, a practically complete precipitation of hydroxides almost entirely free from sulphides is produced by treating the sulphide solution with ammonia and caustic alkali, preferably by adding a sufficient proportion of caustic alkali to form alkali metal sulphide according to the equation

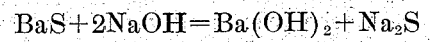
$$BaS + 2NaOH = Ba(OH)_2 + Na_2S$$

The solutions thus produced contain the total amount of sulphur in the form of alkali metal sulphide which is recoverd after the removal of ammonia.

Furthermore, it has been found that the proportion of barium sulphide or strontium sulphide in the initial solution has a great influence on the degree of purity of the hydroxide produced. Thus for example the hydroxide precipitated from a cooled 15 to 20% barium sulphide solution treated with ammonia must be recrystallized, but highly dilute sulphide solutions, when treated with ammonia or caustic alkali and ammonia, yield hydroxide of such purity that the said hydroxide need not be recrystallized. These highly dilute solutions are preferably those in which the proportion of barium sulphide is such that a crystallization of considerable quantities of barium sulphide does not take place when the non-treated solution is cooled down to the temperature of the surrounding air. When dealing with more concentrated solutions, the latter are allowed to cool, after being treated with ammonia, preferably only to such an extent that no barium sulphide is crystallized. Sulphide-containing hydroxide is preferably recrystallized from ammonia containing water so that hydroxide free from sulphide is obtained with greater facility and in greater proportion than when the material is recrystallized from water.

Hard industrial barium sulphide or strontium sulphide may be used as initial material in place of sulphide solutions and may be treated with ammonia in the presence of water. According to one method of proceeding, crude barium sulphide is treated with aqueous ammonia preferably in a closed vessel and at a high temperature, the barium hydroxide being obtained from the solution thus formed. When caustic alkali is used, a preferred method of proceeding consists in first treating the hard sulphide with an aqueous solution of sodium hydroxide or potassium hydroxide and then causing ammonia (for example ammonia gas) to act upon the product thus obtained.

A further advantage of the process according to the present invention is that ammonia may be reintroduced in the cycle of operations. It has indeed been found that by heating the solutions available from the operations involved in the various methods of carrying out the invention, the ammonia is driven out free from considerable amounts of hydrogen sulphide and is therefore fit to be used again straightaway for precipitating hydroxide from fresh quantities of sulphides.

*Examples*

1. Ammonia is added to the extent of 20% to a 9% hot solution of barium sulphide. The crystals precipitated from the cooled solution are washed repeatedly with aqueous ammonia after they are separated from the mother liquor. Barium hydroxide entirely free from sulphides is obtained through one recrystallization from water containing ammonia. The yield is 46,5% of the barium sulphide used. The mother liquor separates from the precipitated barium hydroxide is heated and the ammonia evolved therefore is introduced into a fresh solution of barium sulphide.

2. A 10.2% solution of barium sulphide is mixed with an equal volume of 25% ammonia water. The mixture is cooled and allowed to stand for a time. The precipitated barium hydroxide is separated from the mother liquor and recrystallized from ammonia water. The product thus obtained is entirely free from sulphide.

3. 600 parts of a clear solution containing 70 parts of barium sulphide are mixed with 365 parts of a soda lye containing 35 parts of NaOH. Ammonia is introduced into the warm solution under stirring until 220 parts are absorbed. The barium hydroxide precipitated when the material is cooling is separated from the mother liquor and washed with cold water. The yield in crystalline barium hydroxide is 144 parts (86%) of the barium sulphide used, the said hydroxide containing only 0,7% of its barium in the form of barium sulphide. A little more barium sulphide is precipitated when the mother liquor is further cooled. The solution is then heated to expel the ammonia which is again used for treating a fresh quantity of barium sulphide.

4. 225 parts of industrial barium sulphide (containing 72% BaS) are heated for an hour at a pressure of 1½ atmospheres with 1300 parts of 25% ammonia in an autoclave fitted with an agitator. The barium hydroxide crystallizes out of the filtered solution when the latter is cooling. As already stated, the said hydroxides may be further treated. The yield is 42% of the BaS contained in the crude barium sulphide used.

5. 100 parts of industrial barium sulphide (containing 72% BaS) are boiled with 100 parts of water and 34 parts of sodium hydroxide. The mixture is filtered and ammonia is introduced in the hot filtrate. The barium hydroxy-crystals precipitated when the material is cooling are exhausted at 25° C. and washed a few times with water. The yield is 83% of the BaS contained in the barium sulphide used. The product has only traces of sulphide.

6. Ammonia is introduced to saturation in a hot filtered solution of strontium sulphide. A sulphide-free product is obtained by washing the precipitated strontium hydroxide with cold water. The yield is 46% of the strontium sulphide used. The mother liquor separated from the strontium hydroxide is heated to expel the ammonia. Sulphuretted hydrogen is liberated by introducing carbon dioxide in the residual solution of strontium hydroxide. The yield is 96% of the sulphur contained in the sulphide used.

7. 50 parts of industrial strontium sulphide containing 72% SrS are boiled with 300 parts of water and 25 parts of sodium hydroxide. Ammonia is introduced in the filtered hot solution until 78 parts are absorbed. After washing, the strontium hydroxide crystallized out of the cooling material contains only 0,2% of its proportion of strontium in the form of strontium sulphide. The yield is 92% of the strontium sulphide contained in the initial material.

Having now particularly described and ascertained the nature of my said invention and in what manner the same is to be performed, I declare that what I claim is:

1. A method for making practically sulphide free alkali-earth metal hydroxide from water soluble alkali-earth metal sulphide which consists in precipitating alkali-earth metal hydroxide from aqueous solutions of alkali-earth metal sulphide by ammonia in presence of alkali-metal hydroxide in amounts sufficient to convert the alkali-earth metal sulfohydrate present into alkali-earth metal hydroxide and alkali-metal sulphide, and separating the precipitated alkali-earth metal hydroxide from the solution.

2. A method for making practically sulphide free barium hydroxide from barium sulphide which consists in precipitating barium hydroxide from aqueous solutions of barium sulphide by ammonia in presence of alkali-metal hydroxide in amounts sufficient to convert the barium sulfohydrate present into barium hydroxide and alkali-metal sulphide, and separating the precipitated barium hydroxide from the solution.

3. A method for making practically sulphide free alkali-earth metal hydroxide from water soluble alkali-earth metal sulphide, which consists in treating aqueous solutions of alkali-earth metal sulphide with alkali-metal hydroxide in amounts sufficient to convert the alkali-earth metal sulfohydrate present into alkali-earth metal hydroxide and alkali-metal sulfide, precipitating alkali-earth metal hydroxide from the solution obtained by treatment with ammonia and separating the precipitated alkali-earth metal hydroxide from the solution.

4. A method for making practically sulphide free barium hydroxide from barium sulphide, which consists in treating aqueous solutions of barium sulphide with alkali-metal hydroxide in amounts sufficient to convert the barium-sulfohydrate present into barium hydroxide and alkali-metal sulfide, precipitating barium hydroxide from the solution obtained by treatment with ammonia and separating the precipitated barium hydroxide from the solution.

5. A method for making practically sulphide free alkali-earth metal hydroxide from water soluble alkali-earth metal sulphide, which consists in treating aqueous solutions of alkali-earth metal sulphide with alkali-metal hydroxide in amounts sufficient to convert the alkali-earth metal sulfohydrate present into alkali-earth metal hydroxide and alkali-metal sulphide, precipitating alkali-earth metal hydroxide from the solution obtained by treatment with ammonia, separating the precipitated alkali-earth metal hydroxide from the solution and recrystallizing the alkali-earth metal hydroxide obtained in an aqueous solution of ammonia.

6. A method for making practically sulphide free barium hydroxide from barium sulphide, which consists in treating aqueous solutions of barium sulphide with alkali-metal hydroxide in amounts sufficient to convert the barium sulfohydrate present into barium hydroxide and alkali-metal sulphide, precipitating barium hydroxide from the solution obtained by treatment with ammonia, separating the precipitated barium hydroxide from the solution and recrystallizing the barium hydroxide obtained in an aqueous solution of ammonia.

7. Process for the preparation of substantially sulphide-free barium hydroxide consisting in treating a 9% hot solution of barium sulphide with about 20% of ammonia, cooling said solution thereby precipitating crystals of barium hydroxide therefrom and washing repeatedly said crystals with aqueous ammonia.

In testimony whereof I affix my signature.

BERNHARD CONRAD STUER.